United States Patent
Hirayama et al.

(10) Patent No.: US 9,397,431 B2
(45) Date of Patent: Jul. 19, 2016

(54) ELECTRICAL CONNECTOR AND A METHOD OF MANUFACTURING THE SAME

(71) Applicant: DENSO CORPORATION, Kariya, Aichi-pref. (JP)

(72) Inventors: Yuuto Hirayama, Kariya (JP); Tooru Taguchi, Handa (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/628,914

(22) Filed: Feb. 23, 2015

(65) Prior Publication Data
US 2015/0244097 A1 Aug. 27, 2015

(30) Foreign Application Priority Data

Feb. 24, 2014 (JP) ................................. 2014-033291

(51) Int. Cl.
| | | |
|---|---|---|
| H01R 13/40 | (2006.01) | |
| H01R 13/405 | (2006.01) | |
| H01R 43/18 | (2006.01) | |
| H01R 43/20 | (2006.01) | |
| H01R 13/52 | (2006.01) | |
| G01L 19/00 | (2006.01) | |
| H01R 13/533 | (2006.01) | |

(52) U.S. Cl.
CPC .......... *H01R 13/405* (2013.01); *G01L 19/0084* (2013.01); *H01R 13/5202* (2013.01); *H01R 13/5216* (2013.01); *H01R 43/18* (2013.01); *H01R 43/20* (2013.01); *H01R 13/533* (2013.01); *Y10T 29/4922* (2015.01)

(58) Field of Classification Search
CPC .......... H01R 13/5219; H01R 13/5208; H01R 13/5205; H01R 43/24; H01R 13/025; H01R 13/5216

USPC .......... 439/271–274, 276, 587, 589, 736, 930, 439/936
See application file for complete search history.

(56) References Cited

U.S. PATENT DOCUMENTS

| | | | | |
|---|---|---|---|---|
| 4,335,932 A | * | 6/1982 | Herrmann, Jr. ...... | B29C 33/0016 174/541 |
| 4,875,870 A | * | 10/1989 | Hardy ................ | H01R 13/5216 174/76 |
| 5,433,628 A | | 7/1995 | Sadaishi et al. | |
| 5,518,415 A | * | 5/1996 | Sano ..................... | H01R 13/521 439/204 |
| 6,149,456 A | * | 11/2000 | Uchiyama ............ | H01R 13/521 439/488 |
| 6,851,962 B2 | * | 2/2005 | McCormack, III .. | H01R 13/748 439/276 |
| 6,854,996 B2 | * | 2/2005 | Yaworski ................. | H01R 4/36 174/71 B |
| 7,445,481 B2 | * | 11/2008 | Nagashima .......... | H01R 13/521 439/276 |
| 8,647,132 B2 | * | 2/2014 | Kuroda .............. | H01R 13/5208 439/271 |
| 8,814,606 B2 | * | 8/2014 | Endo ..................... | H01R 13/405 439/736 |
| 8,992,243 B2 | * | 3/2015 | Cameron ........... | H01R 13/5202 439/271 |
| 2007/0117440 A1 | | 5/2007 | Nagashima et al. | |

FOREIGN PATENT DOCUMENTS

| | | |
|---|---|---|
| JP | 6-84565 | 3/1994 |
| JP | 4565337 | 8/2010 |
| JP | 2013-168212 | 8/2013 |

\* cited by examiner

*Primary Examiner* — Thanh Tam Le
(74) *Attorney, Agent, or Firm* — Nixon & Vanderhye P.C.

(57) ABSTRACT

A liquid adhesive sealant for bonding a connector case and a terminal holder is filled in a sealant filled chamber formed in a space surrounded by a first fitting peripheral wall and a bottom surface of a first groove of the connector case made of a primary molding resin, and a second fitting peripheral wall and a bottom surface of a second groove of the terminal holder made of the primary molding resin in an electrical connector.

8 Claims, 11 Drawing Sheets

ELECTRICAL CONNECTOR AND A METHOD OF MANUFACTURING THE SAME

CROSS-REFERENCE TO RELATED APPLICATION

This application is based on and claims the benefit of priority from earlier Japanese Patent Application No. 2014-33291 filed Feb. 24, 2014, the description of which is incorporated herein by reference.

TECHNICAL FIELD

The present disclosure relates to an electrical connector that electrically connects between a circuit of an internal apparatus and an external circuit, and a method of manufacturing the same.

Especially, the present disclosure relates to an electrical connector that electrically connects between a sensor unit used in an internal combustion engine and an external circuit, and a method of manufacturing the same.

BACKGROUND

Conventionally, as an example of an electrical connector that electrically connects between a circuit of an internal apparatus and an external circuit, an electrical connector that electrically connects between a circuit for processing an output signal of a fuel pressure sensor 101 shown in FIGS. 10 and 11 and an external circuit is known.

The fuel pressure sensor 101 is attached by screwing to a housing recess 103 of an injector body 102 of an injector that injects fuel into a combustion chamber formed in a cylinder of an internal combustion engine such as a diesel engine, for example, and is for detecting a pressure of fuel injected into the chamber of the engine.

The electrical connector of the fuel pressure sensor 101 has a plurality of terminals 104, a connector case 105 made of a primary molding resin to which a mating connector is fitted, and a connector housing 107 made of a secondary molding resin. The connector housing 107 covers and seals a periphery of a terminal holding portion 106 of the connector case 105 by inserting the terminal holding portion 106 into the secondary molding resin.

The connector case 105 has the terminal holding portion 106 that supports the terminal by embedding intermediate portions of the plurality of terminals 104, and a bottomed cylindrical fitting hood 108 to which the mating connector is fitted.

A fitting recess (cavity) 109 is formed in the fitting hood 108.

An internal connecting portion 111 conductively connected with a terminal electrode 110 of a circuit section of the fuel pressure sensor 101 is provided to each base end of the plurality of terminals 104.

In addition, an external connecting terminal (hereinafter connector terminal) 112 that electrically connects to a mating terminal is disposed on each front end of the plurality of terminals 104.

The connector terminals 112 are projected from a bottom surface of the connector case 105 into the cavity 109 and are exposed therein.

Further, an intermediate portion 113 is provided between the internal connecting portion 111 and the connector terminal 112. The intermediate portion 113 is supported embedding inside the terminal holding portion 106 by an insertion of the primary molding resin.

Furthermore, the circuit section of the fuel pressure sensor 101, the internal connecting portions 111 and the terminal holding portion 106 are supported embedded inside the connector housing 107 by an insertion of the secondary molding resin.

However, when the fuel pressure sensor 101 is disposed in the housing recess 103 of the injector body 102, there is a possibility of liquid such as water or oil entering into the cavity 109 of the electrical connector of the connector case 105.

On the other hand, there is a possibility that small gaps are formed between the connector case 105 and the connector housing 107, and between the connector terminals 112 and the intermediate portions 113 because the primary molding resin forming the connector case 105 and the connector terminals 112 that are the inserted components do not fit tightly.

In such a case, when the liquid enters into the cavity 109, there is a possibility that the liquid may enter into a conductively connected portion of each terminal electrode 110 of the fuel pressure sensor 101 and the internal connecting portion 111 of the plurality of the terminal 104 through gaps between the connector case 105 and the connector housing 107, and between the connector terminals 112 and the intermediate sections 113.

Here, a sealing structure for liquid infiltration to the conductively connected portion from the gaps between the connector case 105 and the connector housing 107, and between the connector terminals 112 and the intermediate sections 113, the following structure is generally known.

That is, a method of sealing peripheries of the connector terminals 112 by pouring a sealant 114 on a bottom surface of the cavity 109, or a method of embedding the terminal 104 by insert-molding in the interior of the terminal holding portion 106 of the connector case 105 by applying the sealant 114 on the surface of the terminal 104 are known (refer to Japanese Patent Publication No. 4565337 and Japanese Patent Application Laid-Open Publication No. H06-084565, for example).

However, in the conventional electrical connector of the fuel pressure sensor 101, if a filling amount of sealant 114 is too large, the electrical connector may not be able to be fitted to the mating connector in a regular fitting position, and if the filling amount is reduced in order to avoid it, there is a problem that the sealing ability is lowered.

Further, an external connector having five terminal fittings, a sealant filling section for filling a sealant, a first holding portion that communicates with the sealant filling section for holding the terminal fittings, and a primary molded body with a second holding portion that communicates with the sealant filling section for holding the terminal fittings is known as an electrical connector (see Japanese Patent Application Laid-Open Publication No. 2013-168212, for example).

In a case of the external connector having such a sealant filling section, since the sealant filling section is open to the outside, a sealant heat resistance (heat resistance reliability, and heat deterioration resistance) during the secondary molding has to be secured.

Further, it is necessary to suppress a decrease in adhesive strength and adhesion of the sealant during heat deterioration during the secondary molding.

Although this is the same in implementation of an integral molding by applying the sealant, when the sealant cannot tolerate the temperature during integral molding, there is a problem that the above structure may not be satisfactory.

SUMMARY

An embodiment provides an electrical connector and a method of manufacturing the same that are capable of securing a sealant heat resistance (heat resistance reliability, heat deterioration resistance, and heat deterioration adhesiveness, etc., for example) during a secondary molding sealant.

Another object of the present disclosure is to provide the electrical connector and the method of manufacturing the same capable of improving sealing performance for liquid infiltration into an interior In an electrical connector according to a first aspect, the electrical connector includes a plurality of terminals disposed parallel with each other at predetermined intervals, each of the terminals having an intermediate portion between a tip end and a base end thereof.

The electrical connector further includes a case made of primary molding resin having a bottomed cylindrical fitting hood to which a mating connector is fitted, a bottomed cylindrical first fitting peripheral wall projected toward an opposite side where the fitting hood is projected, and a plurality of insertion holes that communicates between a bottom surface of the fitting hood and a bottom surface of the first fitting peripheral wall, while the intermediate portion is inserted.

The electrical connector further includes a holder made of primary molding resin having a bottomed cylindrical second fitting peripheral wall projected on a side where it overlaps with the first fitting peripheral wall and is fitted to an inner periphery of the first fitting peripheral wall, and a terminal holding section that supports the terminal by embedding each base end in a state where the intermediate portion is projected from a bottom surface of the second fitting peripheral wall.

The electrical connector further includes a sealant filled between the bottom surface of the first fitting peripheral wall and the bottom surface of the second fitting peripheral wall, seals gaps between the case or the holder and the terminals, and bonds the case and the holder.

The electrical connector further includes a housing made of secondary molding resin that seals by covering at least a fitting portion of the first fitting peripheral wall and the second fitting peripheral wall, and the holder.

The holder has a second groove that opens at a front end of the second fitting peripheral wall and extends from an opening of the second groove to the bottom surface of the second fitting peripheral wall, and a sealed chamber formed between the bottom surfaces of the first fitting peripheral wall and the second groove, and the holder is communicated with each insertion hole. The sealant is filled in the sealed chamber.

According to the present disclosure (electrical connector), the sealed chamber that communicates with the plurality of insertion holes is formed in a space surrounded by the bottom surface of the first fitting peripheral wall of the case made of a synthetic resin and the bottom surface of the groove (the bottom surface of the second fitting peripheral wall) of the holder made of the synthetic resin, and the sealant made of synthetic resin that bonds the case and holder is filled in the sealed chamber.

Thereby, the sealing performance for sealing the gaps between the case, the holder, and the plurality of intermediate portions of the terminals can be improved without disturbing a functional structure of the product given a resistance against vibration.

Further, in a case of insert molding the insert part formed by the bonded case and the holder by the adhesive sealant in the synthetic resin that forms the housing, a rise in temperature transferred to the adhesive sealant can be suppressed by the sealed chamber surrounded by the first and the second fitting peripheral walls.

Thus, since the sealant heat resistance (heat resistance reliability, heat deterioration resistance, heat deterioration adhesiveness, etc., for example) during the secondary molding can be secured, the decrease in adhesive strength and adhesion of the adhesive sealant can be suppressed.

Therefore, an adhesive sealant of which the heat during the melting of the secondary molding resin exceeds sealant heat tolerance limit can be used as a sealant for the electrical connector.

In the electrical connector according to a second aspect, the second fitting peripheral wall is disposed so as to surround a periphery of the sealed chamber in a circumferential direction.

In the electrical connector according to a third aspect, the intermediate portion is disposed so as to penetrate the sealed chamber.

In the electrical connector according to a fourth aspect, at least one of the case or the holder has uneven portions for increasing a bonding force between the synthetic resin that forms the housing.

In the electrical connector according to a fifth aspect, at the bottom surface of the first fitting peripheral wall or at the bottom surface of the second fitting peripheral wall, the case or the holder has projections projected towards the sealed chamber from portions between the adjoining intermediate portions.

In the electrical connector according to a sixth aspect, the primary molding resin is a thermoplastic resin, and the secondary molding resin is a thermosetting resin.

In the electrical connector according to a seventh aspect, the sealant is a thermosetting adhesive sealant that seals the gaps by flowing therein when being filled into the sealed chamber, and can bond the case and the holder by a subsequent heat hardening.

In a method of manufacturing the electrical connector according to an eighth aspect, the method includes a step of manufacturing the primary molded body having the fitting hood, the first fitting peripheral wall, and the plurality of insertion holes by forming the case by primary molding that fills a thermoplastic resin which is the primary molding resin into a mold.

The method further includes a step of manufacturing a first insert molded body by insert-molding the plurality of terminals to form the holder by primary molding that fills the primary molding resin into the mold.

The method further includes a step of forming the sealed chamber between the bottom surfaces of the first fitting peripheral wall and the second groove, and filling a liquid thermosetting adhesive sealant having fluidity used as the sealant into the sealed chamber.

The method further includes a step of manufacturing a primary temporary assembled resin body by assembling the primary molded body and the first insert molded body by fitting the first fitting peripheral wall and the second fitting peripheral wall while inserting the middle portions of the plurality of terminals into the plurality of insertion holes.

The method further includes a step of forming the housing by insert-molding the primary temporary assembled resin body by secondary molding that fills the secondary molding which is a thermosetting resin into the mold, forming a primary molding resin adhesive body by bonding and fixing the primary molded body and the first insert molded body by using the sealant, and manufacturing the second insert molded body by insert-molding the primary molding resin adhesive body into the thermosetting resin simultaneously.

According to the present disclosure (method of manufacturing the electrical connector), the primary molded body (case) and the first insert molded body (holder) are formed by primary molding that injects and fills the primary molding resin into the injection mold.

Then, a hardening process of the adhesive sealant can be done after mating of the primary molded body (case) and the first insert molded body (holder) until before secondary molding ends, or during secondary molding.

Accordingly, hardening time of the adhesive sealant from a liquid state to be hardened can be overlapped with, or included within the heat hardening time of the secondary molding resin compared with a conventional manufacturing method of manufacturing a second insert molded body. The conventional manufacturing method is to perform secondary molding by inserting the primary molding resin adhesive body after bonding and fixing the primary molded body (case) and the first insert molded body (holder). This bonding and fixing process is performed by hardening the adhesive sealant after fitting the primary molded body (case) and the first insert molding body (holder).

Furthermore, structural changes of the fitting hood that is to be fitted to the mating connector becomes unnecessary, and preventing deterioration of the adhesive sealant due to thermal effect during insert molding or during integral molding is prevented, while the sealing performance for sealing the gaps between the case or the holder and the plurality of intermediate portions of the terminals can be improved.

Thus, the sealing performance that seals the gaps between the case or the holder and the intermediate portions of the terminals can be imparted without impairing the properties of the electrical connector such as the resistance against vibration and fitting compatibility.

Moreover, in a manufacturing process, such as insert molding or integral molding to which high temperature is applied, it becomes possible to use an adhesive sealant having lower heat resistance than the temperature during a conventional secondary molding as a sealant for the electrical connector.

DETAILED DESCRIPTION OF THE PREFERABLE EMBODIMENT

With reference to FIGS. 1 to 9B, hereinafter will be described an embodiment of the present disclosure regarding an electrical connector.

[Configuration of the Embodiment]

FIGS. 1 to 9B show an electrical connector to which the present disclosure is applied.

An injector of the present embodiment (not shown) has an injection hole for injecting fuel into a combustion chamber formed in a cylinder of an internal combustion engine (not shown) and a fuel passage that communicates with the injection hole.

The injector has a nozzle body that includes a nozzle needle for opening and closing the injection hole, an injector body 1 that has the fuel passage communicating with the injection hole via a fuel passage formed in the nozzle body, and a retaining nut that fixes the nozzle body to a tip end in a longitudinal direction (lower side in FIG. 1) of the injector body 1 by fastening.

A piezoelectric actuator that drives the nozzle needle in a valve opening direction when receiving an injector driving signal, and a back pressure control mechanism that controls the back pressure of the nozzle needle by being driven by the piezo actuator are accommodated inside the injector body 1.

Figure 1:
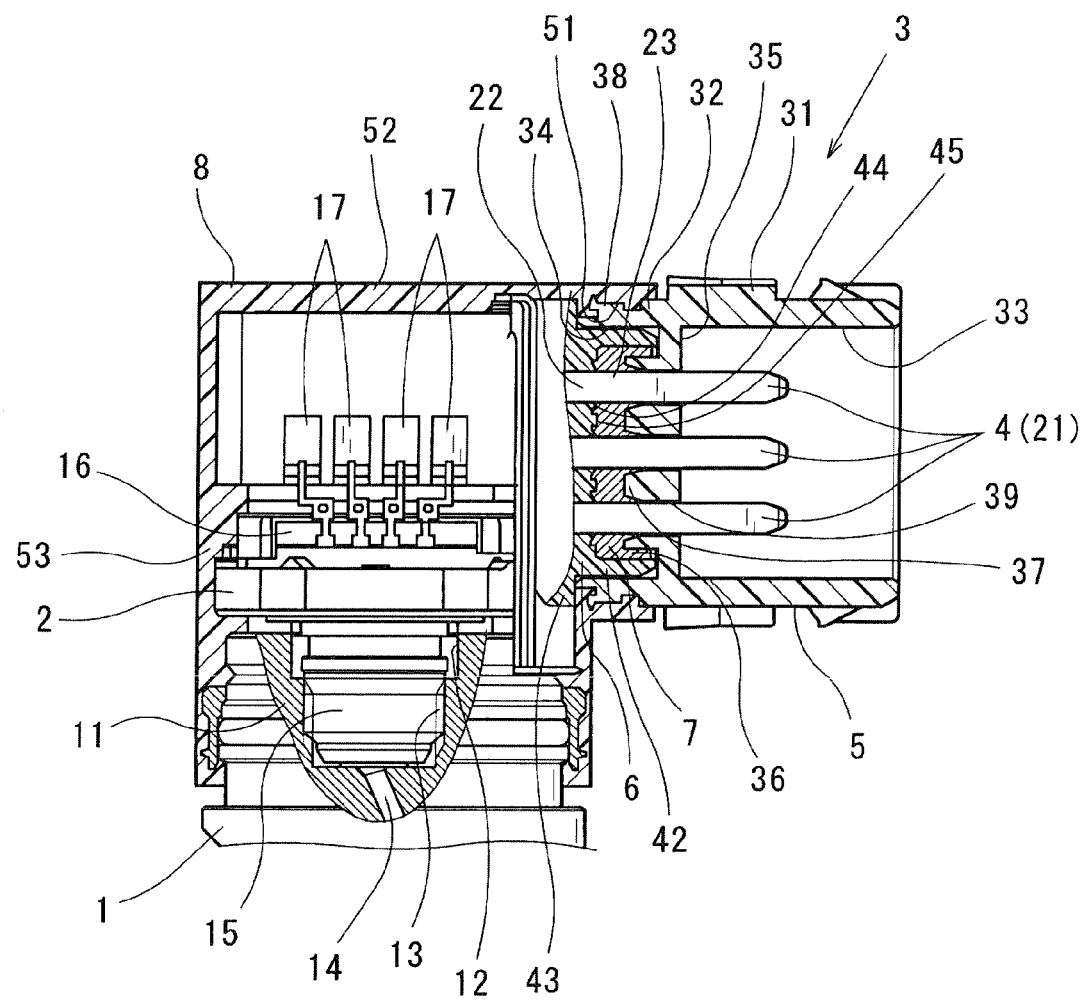
FIG. 1 shows a cross-sectional view of an electrical connector of a fuel pressure sensor in an embodiment.

A fuel pressure sensor 2 that measures (detects) a pressure of a fuel flowing through the fuel passage of the injector body 1, and an electrical connector 3 for external connection that electrically connects the piezoelectric actuator and the fuel pressure sensor 2 with an external circuit (ECU and a battery, etc.) is disposed at the upper end in FIG. 1 of the injector body 1.

The electrical connector 3 has a plurality of terminals 4 (first to sixth), a connector case (primary molded body) 5, a terminal holder (a first insert molded body) 6, thermosetting adhesive sealant (hereinafter adhesive sealant) 7, and a connector housing 8.

The first to fourth terminals 4 are conductively connected respectively to first to fourth terminal electrodes (described later) of a sensor circuit section (described later) that processes input and output signals of the fuel pressure sensor 2.

The fifth and sixth terminals 4 are conductively connected to a pair of piezo leads extending from the piezoelectric actuator.

The connector case 5 is primary molded by a primary molding resin which is a synthetic resin.

A terminal holder 6 is primary molded by the primary molding resin which is the synthetic resin.

The adhesive sealant 7 is filled between the connector case 5 and the terminal holder 6.

The connector housing 8 is secondary molded by a secondary molding resin which is the synthetic resin.

Here, the injector body 1 has a cylindrical sensor supporting section 11 at an end in an axial direction opposite to the injection hole (upper side in FIG. 1).

The fuel pressure sensor 2 that outputs an analog pressure signal to a microcomputer of an ECU corresponding to an external circuit is assembled to the sensor supporting section 11.

A housing recess 12 that opens in an upper end surface in FIG. 1 (an end face opposite to the injection hole) of the sensor supporting section 11 and extends in the axial direction towards an inner side from the opening is formed in the sensor supporting section 11.

A female screw 13 is formed in an inner periphery of the housing recess 12.

Further, an outlet (pressure introduction port) of a branch passage (fuel passage) 14 branched from the fuel passage of the injector body 1 is opened in a bottom surface of the housing recess 12.

The fuel pressure sensor 2 that detects the fuel pressure fluctuation varying in accordance with the fuel injection to each cylinder is assembled to the housing recess 12.

The fuel pressure sensor 2 is a fuel pressure sensor unit for detecting the pressure of the fuel injected into the combustion chamber of the engine.

The fuel pressure sensor 2 is provided with a stem (strain body) 15, a sensor chip (semiconductor chip; not shown), and a sensor circuit section (mold IC) 16.

The stem 15 is elastically deformed by receiving the pressure of the high pressure fuel in the branch passage 14 of the injector body 1.

The sensor chip has a plurality of strain gauges (semiconductor piezoresistors) that convert amounts of strain generated in the stem 15 into electric signals and output them as detected pressure values.

The sensor circuit section 16 processes the input and output signals of the sensor chip.

The fuel pressure sensor 2 is fixed inside the connector housing 8 by molding (support by embedding) by insert-molding of the secondary molding resin together with the connector case 5 and the terminal holder 6.

The stem 15 is formed by a bottomed cylindrical metal.

The stem 15 is a fastening body that is fastened by screwing to the female screw 13 of the housing recess 12 in the injector body 1.

Although not shown, the stem 15 has a diaphragm which is a thin flat portion on one end side, and has a pressure introducing hole for introducing the fuel pressure to the diaphragm on another end.

A male screw that is screwed to the female screw 13 of the housing recess 12 in the injector body 1 is formed below a middle portion in FIG. 1 of an outer peripheral surface of the stem 15.

The fuel pressure sensor 2 is attached to the sensor supporting section 11 of the injector body 1 by screw-fastening the male screw of the stem 15 to the housing recess 12 of the injector body 1.

The sensor chip is bonded to a surface of the diaphragm (sensor mounting surface) that is a sensor mounting portion of the stem 15 by low melting point glass.

The sensor chip is intended to function as a strain gauge for detecting the strain generated when the diaphragm is deformed by the fuel pressure introduced into the pressure introducing hole of the stem 15.

The sensor chip is obtained by forming four rectangular strain gauges, which are piezoresistors R1-R4, on a square-shaped semiconductor substrate (single crystal silicon substrate).

The four piezoresistors are disposed on the same circumference around a center point of the diaphragm that is positioned on a rotation center line of the fuel pressure sensor 2 when screw-fastening the fuel pressure sensor 2 to the injector body 1.

The four piezoresistors constitute a bridge circuit on the sensor chip, while wirings and electrode pads for connecting to an external circuit, and further a protective film are formed on the sensor chip.

The sensor chip is bonded onto the surface of the diaphragm of the stem 15 by low melting point glass.

Thereby, the sensor chip can convert a displacement of the diaphragm (strain generated in the diaphragm) displaced (deflected) by an action of the pressure of the fuel flowing into the pressure introducing hole of the stem 15 to an electric signal (in the present embodiment, a potential difference in the bridge circuit accompanying the resistance change of the piezoresistor).

The electrical signal is processed by the sensor circuit 16, and the fuel pressure is detected.

The sensor circuit section 16 is formed by resin sealing (molding) a circuit board constituting a sensor signal processing circuit in the fuel pressure sensor 2 with a molding resin material having an insulating property.

Electrode portions (electrode pad group) for electrically connecting to electrode portions (electrode pad group) of the sensor chip are formed on one end of the circuit board of the sensor circuit part 16 through bonding wires (not shown).

In addition, electrode portions (electrode pad group) for electrically connecting to the first to fourth terminals 4 are formed on another end of the circuit board of the sensor circuit section 16 through first to fourth terminal electrodes 17.

Figure 2A:
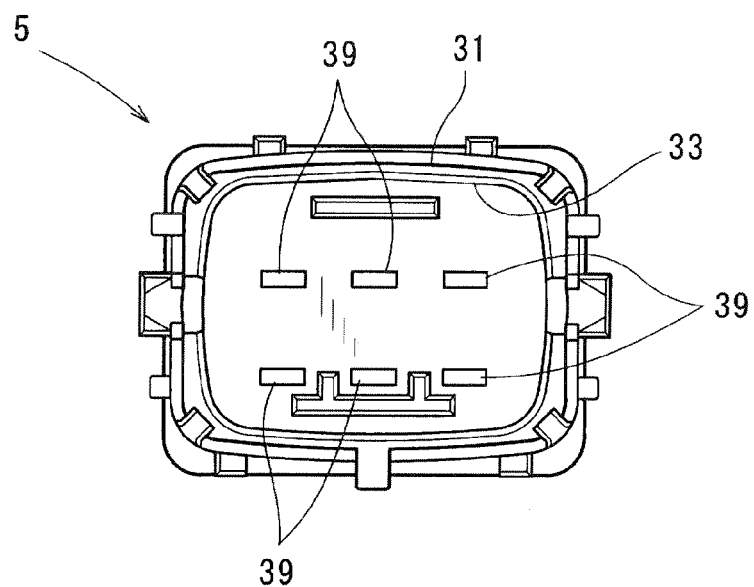
FIG. 2A shows a top view of a connector case.
Figure 2B:
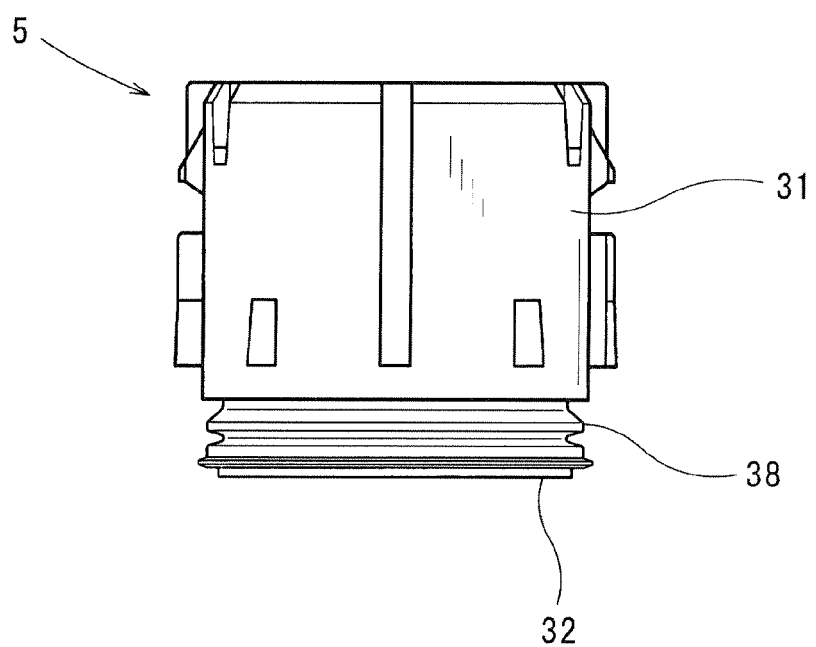
FIG. 2B shows a side view of the connector case.
Figure 3A:
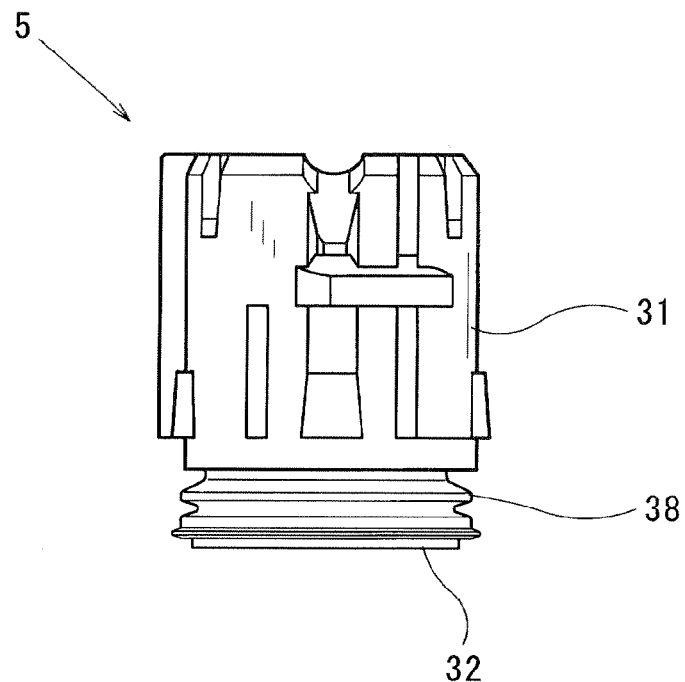
FIG. 3A shows another side view of the connector cases.
Figure 3B:
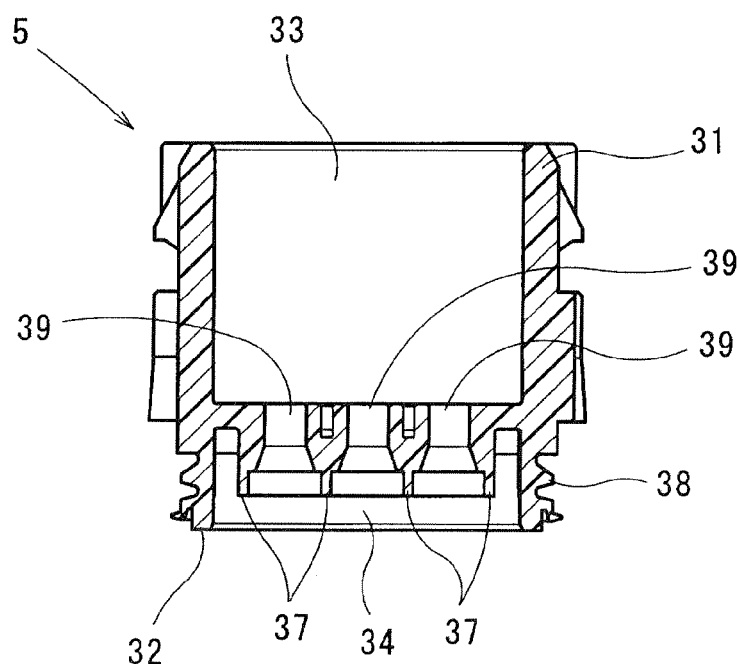
FIG. 3B shows a cross-sectional view of the connector case.
Figure 4A:
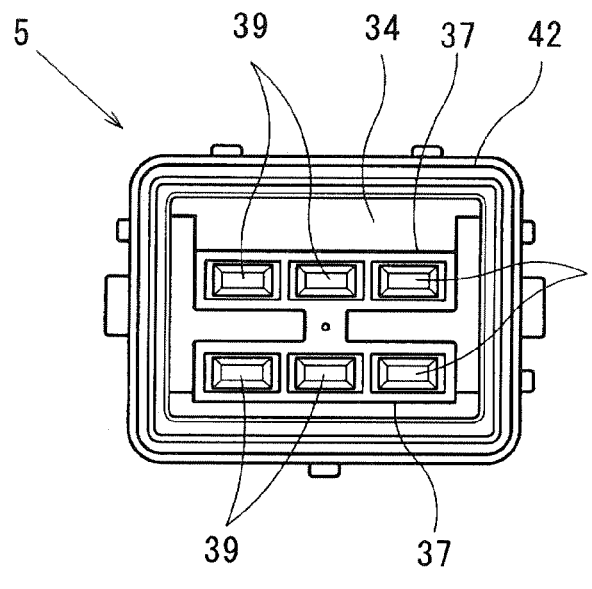
FIG. 4A shows a bottom view of the connector case.
Figure 4C:
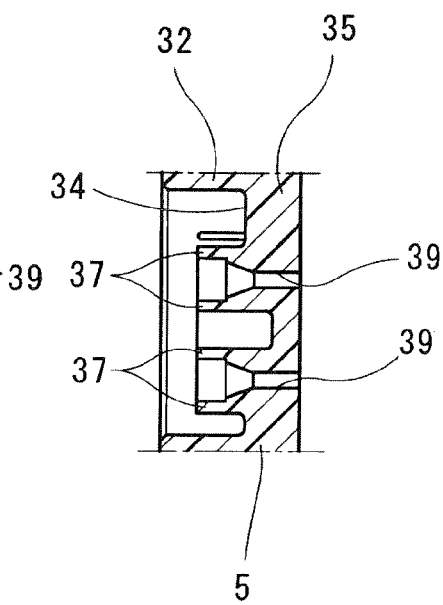
FIG. 4C shows a partial cross-sectional view of the connector case.
Figure 4B:
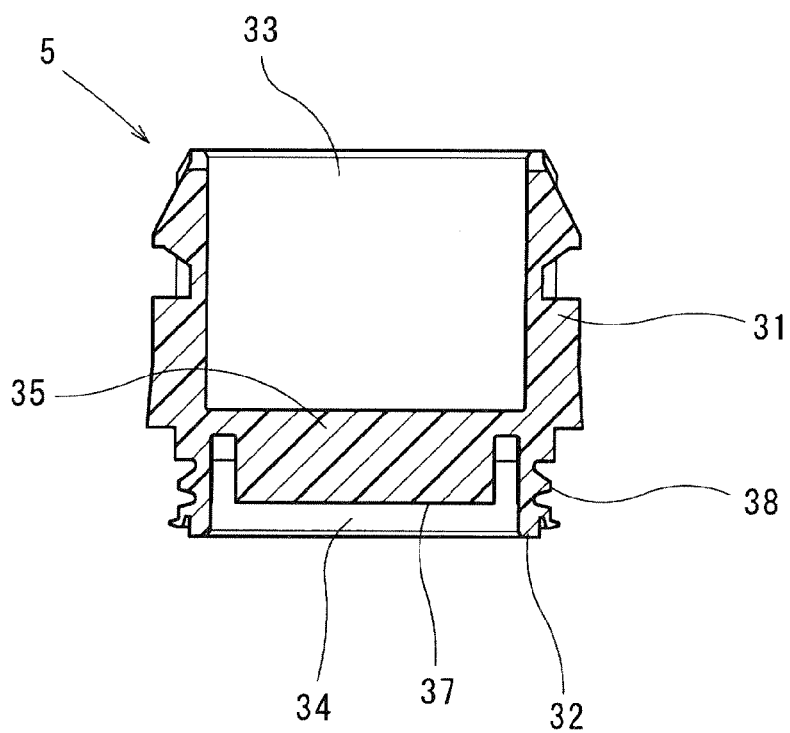
FIG. 4B shows another cross-sectional view of the connector case.
Figure 5A:
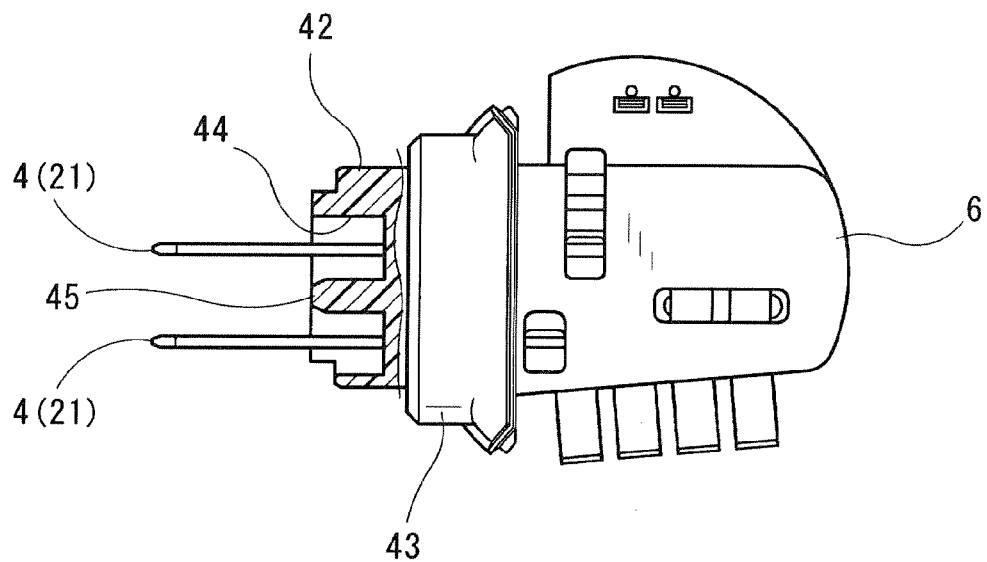
FIG. 5A shows a partial cross-sectional view of a terminal holder.
Figure 5B:
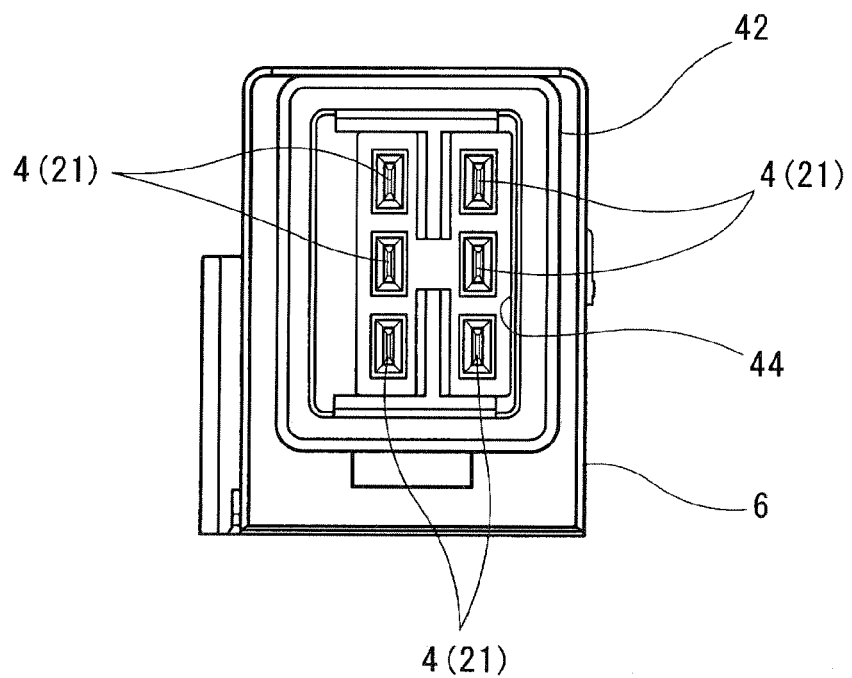
FIG. 5B shows a top view of the terminal holder.
Figure 6A:
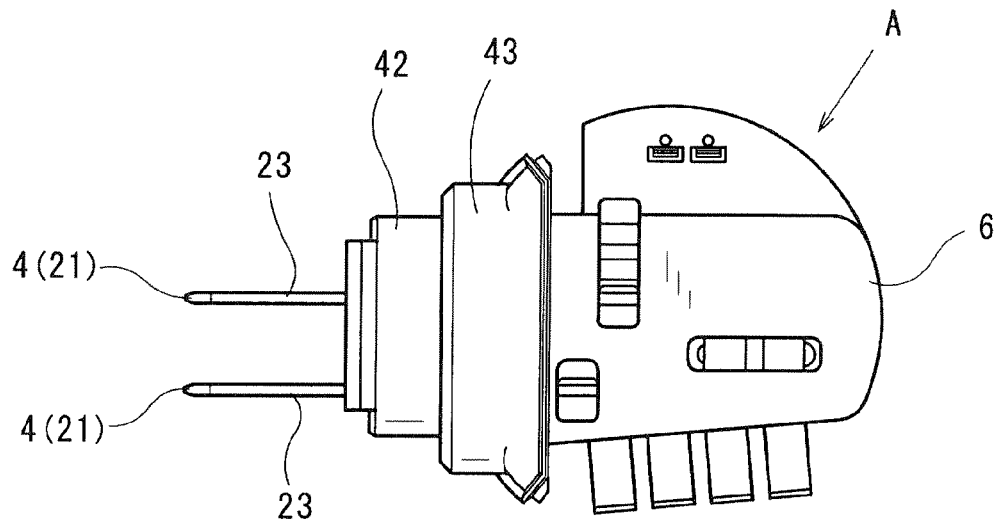
FIG. 6A shows a side view of the terminal holder.
Figure 6B:
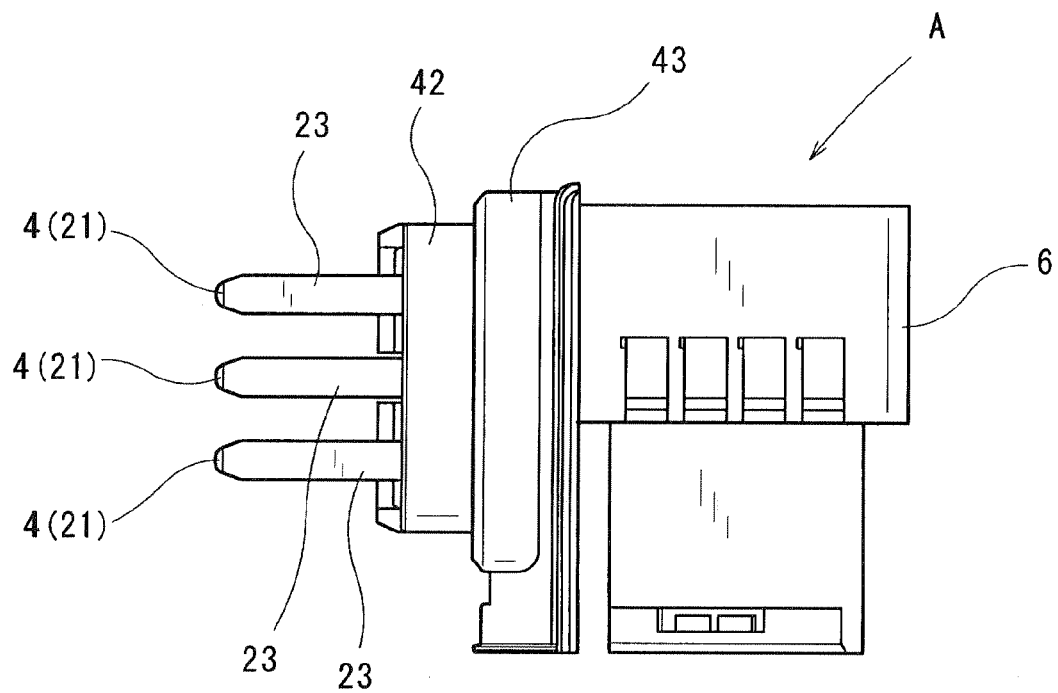
FIG. 6B shows another side view of the terminal holder.

Next, details of the electrical connector 3 of the present embodiment will be briefly described with reference to FIGS. 1, 2A and 2B.

The electrical connector 3 has the first to fourth terminals 4, the connector case 5 made of synthetic resin, the terminal holder 6, and the connector housing 8 made of synthetic resin.

The first to fourth terminals 4 are electrically connected to an A/D conversion circuit, a power supply circuit and the like of the ECU that are external circuits through mating terminals supported in a mating connector and first to fourth wires (wire harness).

The mating connector is fitted and connected to the connector case 5 made of synthetic resin. Terminal holder 6 supports the terminal by embedding the first to fourth terminals 4. The connector housing 8 covers the terminal holder 6.

The first to sixth terminals 4 are metal conductor plates made of, for example, copper alloy or aluminum alloy.

These first to sixth terminals 4 are manufactured by punching a sheet metal having conductivity by a press forming machine and bending the sheet metal at a predetermined part simultaneously or after the punching.

In addition, phosphor bronze tin plating is applied to surfaces of the first to sixth terminals 4.

Furthermore, the first to fourth terminals 4 are disposed parallel with each other at predetermined intervals, and are constituted by integral molding by secondary molding resin inside the terminal holder 6.

Specifically, middle portions of the first to fourth terminals 4 are fixed (supported by embedding) by insert-molding inside the secondary molding resin that constitutes the terminal holder 6.

Inner connecting portions (not shown) where the first to fourth the terminal electrode 17 is conductively connected using means such as laser welding are integrally formed at one ends of the first to fourth terminals 4.

External connecting terminals 21 that electrically connect between the fuel pressure sensor 2 and the A/D conversion circuit and power supply circuit, etc. of the ECU are integrally formed at other ends of the first to fourth terminals 4, that is, on the opposite side of the inner connecting portion side.

The external connecting terminals 21 are projected from a bottom surface of the connector case 5 into a cavity (described later) of the connector case 5 and are exposed therein.

Each of the first to fourth terminals 4 has an intermediate portion 23 between a tip end (external connecting terminal 21) and a base end 22.

Each base end 22 of the first to fourth terminals 4 is fixed inside a terminal holding section (described later) by insert-molding of the primary molding resin that forms the terminal holder 6.

The intermediate portions 23 of the first to fourth terminals 4 are disposed parallel with each other at predetermined intervals, and are disposed so as to penetrate a plurality of terminal insertion holes (described later) and a sealant filled chamber (sealed chamber, described later).

The first terminal 4 is electrically connected to a pressure sensor input section (Vout +) of the ECU, and is a first pressure sensor output terminal (a first connector terminal, a sensor terminal) that outputs a pressure signal from the sensor chip of the fuel pressure sensor 2 to the ECU.

The first terminal 4 is electrically connected to the first terminal electrode 17 that is conductively connected to a first electrode pad (an electrode pad provided corresponding to a pressure signal output terminal (a first output terminal) of the bridge circuit formed on the sensor chip) disposed on the circuit board of the sensor circuit part 16.

The second terminal 4 is electrically connected to a pressure sensor input section (Vout −) of the ECU, and is a second pressure sensor output terminal (a second connector terminal, a sensor terminal) that outputs a pressure signal from the sensor chip of the fuel pressure sensor 2 to the ECU.

The second terminal 4 is electrically connected to the second terminal electrode 17 that is conductively connected to a second electrode pad (an electrode pad provided corresponding to a pressure signal output terminal (a second output terminal) of the bridge circuit formed on the sensor chip) disposed on the circuit board of the sensor circuit part 16.

The third terminal 4 is electrically connected to a power supply side of the ECU, and is a power supply terminal (a third connector terminal, a sensor terminal) that receives a power supply from the ECU.

The third terminal 4 is electrically connected to the third terminal electrode 17 that is conductively connected to a third electrode pad (an electrode pad provided corresponding to an external power supply terminal of the bridge circuit formed on the sensor chip) disposed on the circuit board of the sensor circuit part 16.

The fourth terminal 4 is a ground (GND) terminal (a fourth connector terminal, a sensor terminal) that is electrically connected to the ground (GND) side of the ECU.

The fourth terminal 4 is electrically connected to the fourth terminal electrode 17 that is conductively connected to a fourth electrode pad (an electrode pad provided corresponding to a ground terminal (GND terminal) of the bridge circuit formed on the sensor chip) disposed on the circuit board of the sensor circuit part 16.

Each of the fifth and sixth terminals 4 has an intermediate portion (not shown) between a tip end (external connecting terminal 21) and a base end (not shown).

The fifth and sixth terminals 4 are disposed parallel with each other at predetermined intervals, and are constituted by integral molding by secondary molding resin inside the terminal holder 6.

Specifically, middle portions of the fifth and sixth terminals 4 are fixed (supported by embedding) by insert-molding inside the secondary molding resin that constitutes the terminal holder 6.

Each base end of the fifth and sixth terminals 4 is fixed inside the terminal holder 6 by insert-molding of the primary molding resin.

The intermediate portions of the fifth and sixth terminals 4 are disposed parallel with each other at predetermined intervals, and are disposed so as to penetrate the plurality of terminal insertion holes (described later) and the sealant filled chamber (described later).

The fifth terminal 4 is electrically connected to the power supply side of the ECU, and is a power supply terminal (a fifth connector terminal, a piezo terminal) that receives a power supply from the ECU, and is electrically connected to the positive electrode (+) side piezo lead of the piezoelectric actuator.

The sixth terminal 4 is a ground (GND) terminal (a sixth connector terminal, a piezo terminal) that is electrically connected to the ground (GND) side of the ECU, and is electrically connected to the negative electrode (−) side piezo lead of the piezoelectric actuator.

The connector case 5 is integrally formed by primary molding that injects and fills the primary molding resin, such as thermoplastic resin like polyphenylene sulfide (PPS), polyamide (PA), polyacetal (POM), polybutylene terephthalate (PBT) or the like, for example, into the injection mold.

The connector case 5 is one of the primary molded bodies, and prior to be fitted (prior to be pre-assembled) to the terminal holder 6 that is the other one of the primary molded bodies (the first insert molded body), the connector case 5 is constituted by integrally molded (primary molding) with the molding resin material (primary molding resin material).

The connector case 5 includes a bottomed cylindrical fitting hood 31, a bottomed cylindrical first fitting peripheral wall 32, a cavity 33, a first groove 34, a partition section (partition) 35, a plurality of projections 37, and the like.

The mating connector is fitted to the bottomed cylindrical fitting hood 31.

The bottomed cylindrical first fitting peripheral wall 32 is projected toward an opposite side where the fitting hood 31 is projected.

The cavity 33 opens at a front end of the fitting hood 31, and extends from the opening to the bottom surface of the fitting hood 31.

The first groove 34 opens at the front end of the first fitting peripheral wall 32, and extends from the opening to the bottom surface of the first fitting peripheral wall 32.

The partition 35 divides an inner space of the connector case 5 to the cavity 33 and the first groove 34.

At the bottom surface of the first fitting peripheral wall 32 (left side of the partition 35 in FIG. 1), the projections 37 are projected towards the sealant filled chamber 36 where the adhesive sealant 7 is filled from portions between each intermediate portion 23 of the adjoining first to sixth terminals 4, and from between each intermediate portion 23 of the first to sixth terminal 4 disposed on the outer side and the first fitting peripheral wall 32.

The projections 37 divide between the intermediate portions 23 of the adjoining first to sixth terminals 4.

The fitting hood 31 of the connector case 5 is projected (extended) toward a fitting direction (connecting direction, horizontal direction in FIG. 1) to the mating connector.

The fitting hood 31 is disposed so as to surround a periphery of the cavity 33 in a circumferential direction.

A plurality of uneven portions 38 are formed on the outer periphery of the first fitting peripheral wall 32 in the entire circumferential direction in order to increase the bonding force between the secondary molding resin that forms the connector housing 8.

The cavity 33 constitutes a terminal housing chamber for housing exposed tip portions of the first to sixth terminals 4 (external connecting terminals 21).

The first groove 34 is a fitting groove where a tip of the terminal holder 6 is fitted.

The plurality of terminal insertion holes (first to sixth terminal insertion holes) 39 where the intermediate portions 23 of the first to sixth terminals 4 are inserted in an extending direction are formed in the partition wall 35.

The terminal insertion holes 39 are formed penetrating the partition wall 35 in a thickness direction so as to communicate both sides of the partition wall 35, that is, between a bottom surface of the fitting hood 31 and a bottom surface of the first fitting peripheral wall 32.

The terminal holder 6 is integrally formed by primary molding that inject-fills the primary molding resin, such as thermoplastic resin like polyphenylene sulfide (PPS), polyamide (PA), polyacetal (POM), polybutylene terephthalate (PBT) or the like, for example, into the injection mold.

The terminal holder 6 is a secondary molded body (second insert molded body), and prior to be fitted (prior to be pre-assembled) to the connector case 5, the terminal holder 6 is constituted by integrally molded (primary molding) with the molding resin material (primary molding resin material).

Moreover, the terminal holder 6 includes a bottomed cylindrical second fitting peripheral wall 42, a terminal holding section 43, a second groove 44, a plurality of projections 45, and the like.

The second fitting peripheral wall 42 is projected on a side where it overlaps with the first fitting peripheral wall 32, and is fitted to an inner periphery of the first fitting peripheral wall 32.

The terminal holding section 43 supports the terminals by embedding each base end 22 of first to sixth terminals 4 from a bottom surface of the second fitting peripheral wall 42.

The second groove 44 opens at a front end of the second fitting peripheral wall 42, and extends from an opening of the second groove 44 to the bottom surface of the second fitting peripheral wall 42.

At the bottom surface of the second fitting peripheral wall 42, the projections 45 are projected towards the sealant filled chamber 36 from the portions between each intermediate portion 23 of the adjoining first to sixth terminals 4.

The projections 45 divide between the intermediate portions 23 of the adjoining first to sixth terminals 4.

The sealant filled chamber 36, which is a housing space for housing the adhesive sealant 7 and is communicated with each terminal insertion hole 39, is formed between the bottom surfaces of the first fitting peripheral wall 32 and the first groove 34 and the bottom surfaces of the second fitting peripheral wall 42 and the second groove 44.

Around the sealant filled chamber 36 is surrounded by the second fitting peripheral wall 42 so as not to contact with the secondary molding resin that forms the connector housing 8.

Further, the sealant filled chamber 36 is surrounded by the partition wall 35 of the connector case 5, the second fitting peripheral wall 42 of the terminal holder 6 the terminal holding section 43, and the like.

In addition, the sealant filled chamber 36 is communicated with a gap between each intermediate portion 23 of the first to sixth terminals 4 and the partition 35 of the connector case 5, i.e., walls of the terminal insertion holes 39.

The terminal holding section 43 is fixed inside the connector housing 8 together with the fuel pressure sensor 2, in particular the sensor chip, the sensor mounting portion of the stem 15, and the sensor circuit part 16 by insert-molding of the secondary molding resin that forms the connector housing 8.

Thereby, each base end 22 of the first to sixth terminals 4 is supported by embedding (fixed) in the terminal holding section 43 in a state where each intermediate portion 23 of the first to sixth terminals 4 is projected.

The adhesive sealant 7 is filled in the sealant filled chamber 36 formed between the connector case 5 and the terminal holder 6.

The adhesive sealant 7 seals small gaps between the partition 35 of the connector case 5 and the intermediate portions 23 of the first to sixth terminals 4.

The adhesive sealant 7 seals the gaps by flowing therein when being filled into the sealant filled chamber 36, and also has a function as an adhesive for bonding the connector case 5 and the terminal holder 6 by a subsequent heat hardening.

That is, the adhesive sealant 7 has a function as a liquid thermosetting adhesive sealant having fluidity when being filled into the second groove 44 of the terminal holder 6.

In the present embodiment, heat curable adhesive liquid silicone rubber (hardening conditions: 1 hour at 80 degrees C., or 2 hours at 23 degrees C.), thermal hardening silicone such as silicone adhesive sealant, silicone based adhesive sealant, or epoxy resin based adhesive sealant may be used as a thermosetting adhesive sealant, for example.

In addition, anything can be used as the adhesive sealant 7 as long as it is possible to be filled or injected into the sealant filled chamber 36 or small gaps, hardens after being filled, and suppress the penetration of liquid, such as water or oil, or foreign matters into the small gaps.

Although gel (silicon based, fluorine based, etc.), a thermosetting resin, thermoplastic resin, adhesives or the like can be used as the adhesive sealant 7, it is preferable to use adhesives among these because adhesives can firmly fix (integrate) the connector case 5 and the terminal holder 6.

Further, a sealant having excellent heat resistance, electric insulation, and having excellent adhesiveness and coherency between components is preferable as the adhesive sealant 7.

The connector housing 8 is formed integrally by secondary molding that injects and fills the secondary molding resin, i.e., a thermosetting resin such as epoxy (EP), for example, into an injection mold.

The connector housing 8 is constituted by integral molding (secondary molding) of molding resin material (secondary molding resin material) after manufacturing a primary temporary assembled resin body (the adhesive sealant 7 is not hardened yet and still in a liquid state) by fitting the connector case 5 and the terminal holder 6 together.

The connector housing 8 is a sealing member that seals by covering the fuel pressure sensor 2, a fitting portion of the first fitting peripheral wall 32 and the second fitting peripheral wall 42, and the terminal holder 6.

The connector housing 8 has uneven portions 51 that fit with the uneven portions 38 of the first fitting peripheral wall 32, a holder holding unit 52 that holds the terminal holding section 43 of the terminal holder 6 by embedding, a tubular sensor holder 53 that holds the fuel pressure sensor 2 by embedding, and the like.

The uneven portions 51 can enhance a bonding force between the primary molding resin that forms the connector case 5 and the secondary molding resin that forms the connector housing 8 by fitting with the uneven portions 38.

[Method of Manufacturing Embodiment]

Next, a method of manufacturing the electrical connector 3 of the present embodiment will be briefly described with reference to FIGS. 1 through 9B.

First, the connector case 5 is formed by primary molding that injects and fills the primary molding resin into the injection mold.

Thereby, the connector case 5 that is a primary molded body having the bottomed cylindrical fitting hood 31, the bottomed cylindrical first fitting peripheral wall 32, the cavity 33, the first groove 34, the partition wall 35, the plurality of terminal insertion holes 39, and the like are manufactured (primary molding step, first step).

Specifically, the process of manufacturing the connector case 5, that is the process of injection molding of the connector case 5, is performed in a well-known step order of mold clamping, injecting, pressure holding, cooling, mold opening, and removal of a product.

Then, inserting members are disposed (set) inside the injection mold (fixed type, movable type, or core type if required) that injection-molds the connector case 5, while a cavity (not shown) with a product shape of the connector case 5 is formed within the injection mold.

Then, a primary molding resin material (a thermoplastic resin material) is melted by heating, and the molted resin is injection filled into the cavity by injecting the molten resin into the mold cavity while applying pressure to the molten resin.

Then, the product is removed from the mold after the resin is cooled and solidified (hardened).

By using such an injection molding method, the connector case 5 having the cylindrical fitting hood 31, the cylindrical first fitting peripheral wall 32, the cavity 33, the first groove 34, the partition wall 35, the terminal insertion holes 39, and the like are primary molded as shown in FIG. 2A to FIG. 4C.

Next, the plurality of first to sixth terminals 4 are insert-molded and the terminal holder 6 is formed by primary molding that injects and fills the primary molding resin into the injection mold.

Thereby, the first insert molded body A (refer to FIGS. 6A and 6B, for example) having the first to sixth terminals 4 insert-molded in the primary molding resin is manufactured (primary molding step, second step).

Specifically, the process of manufacturing the terminal holder 6, that is, the process of injection molding of the terminal holder 6, is performed in a well-known step order of placing inserting members, mold clamping, injecting, pressure holding, cooling, mold opening, and removal of a product.

First, as a preceding step to inject-molding the terminal holder 6, the first to sixth terminals 4, which are inserting members, are manufactured in advance.

Each of the first to sixth terminals 4 is formed into a predetermined shape by pressing, bending, etching or cutting the metal conductor plate such as a copper alloy, for example.

Unnecessary parts of the first to sixth terminals 4 may be cut after molding.

Then, the first to sixth terminals 4 are disposed (set) inside the injection mold (fixed type, movable type, or core type if required) that injection-molds the terminal holder 6, while a cavity (not shown) with a product shape of the terminal holder 6 is formed within the injection mold.

Then, the primary molding resin material (the thermoplastic resin material) is melted by heating, and the molted resin is injection filled into the cavity by injecting the molten resin into the mold cavity while applying pressure to the molten resin.

Then, the product is removed from the mold after the resin is cooled and solidified (hardened).

By using such an injection molding method, the terminal holder 6, which is the first insert molded body, having the bottomed tubular second fitting peripheral wall 42, the terminal holding section 43, the second groove 44, the plurality of projections 45, and the like are primary molded as shown in FIG. 5A to FIG. 6B.

Then, the liquid adhesive sealant 7 having fluidity (before hardening) is filled on the bottom surfaces of the second fitting peripheral wall 42 and the second groove 44 of the terminal holder 6 (sealant filling step, third process).

Figure 8A:
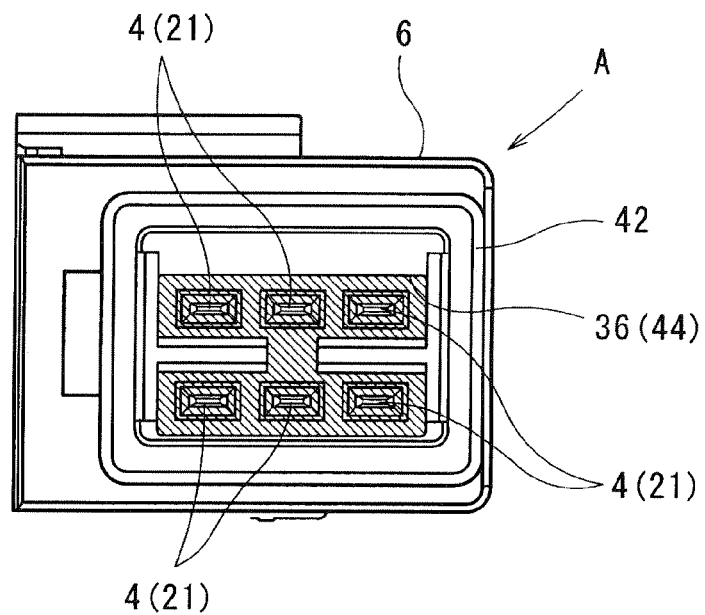
FIG. 8A shows a top view of an adhesive injection process.
Figure 8B:
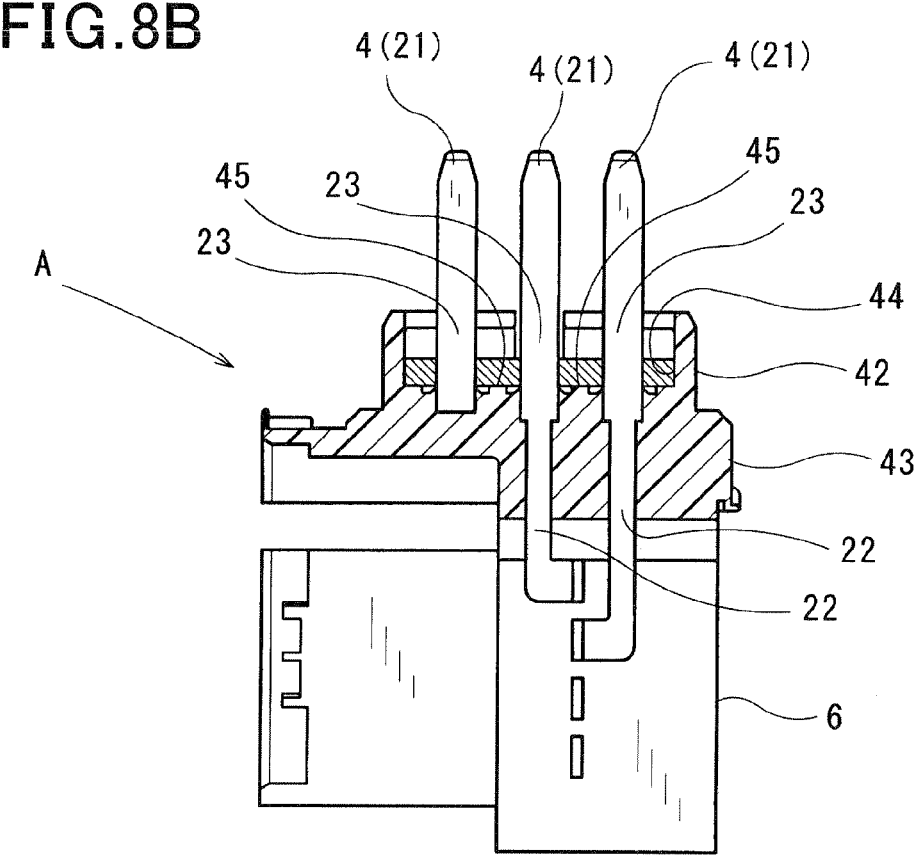
FIG. 8B shows a cross-sectional view of the adhesive injection process.

Here, after the primary molding of the terminal holder 6 (after solidification), and prior to fit and assemble the connector case 5 and the terminal holder 6, as shown in FIGS. 8A and 8B, an appropriate amount of the liquid adhesive sealant 7 is applied on the bottom surfaces of the second fitting peripheral wall 42 and the second groove 44 of the terminal holder 6.

In the next step, for example, the liquid adhesive sealant 7 is applied to the second groove 44 of the terminal holder 6 so that an amount of the sealant becomes more than a volume of the sealant filled chamber 36 formed in a space surrounded by the first fitting peripheral wall 32, the first bottom surface of the groove 34, the second fitting peripheral wall 42, and the bottom surface of the second groove 44.

Figure 9A:
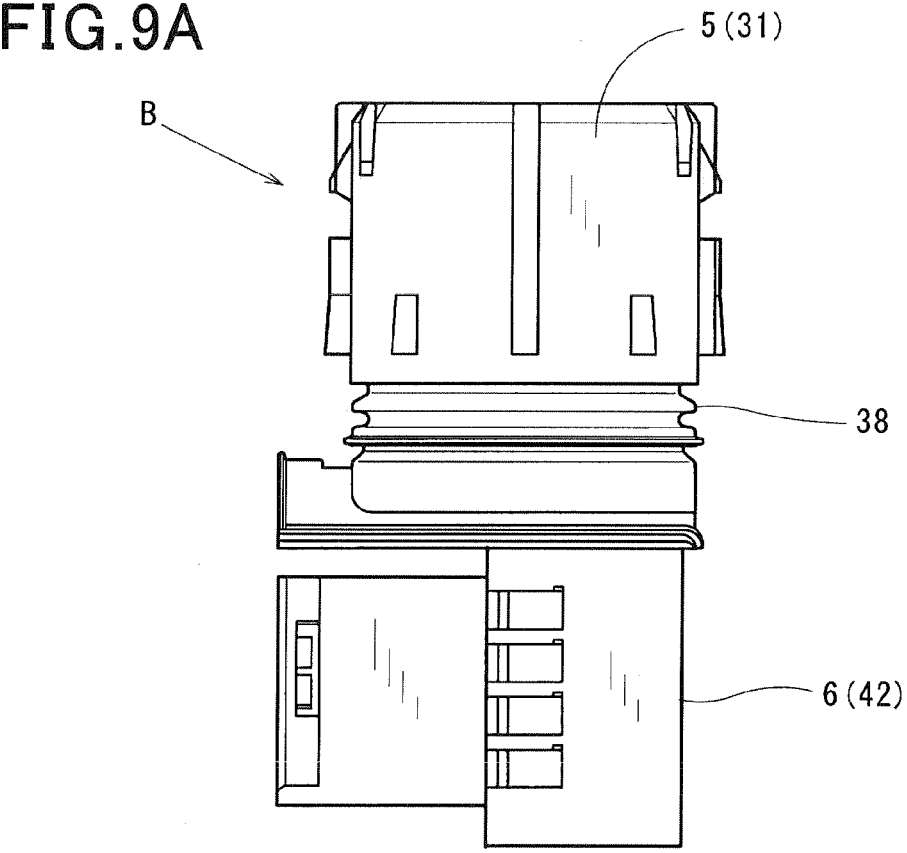
FIG. 9A shows a side view of the electrical connector during adhesive hardening.
Figure 9B:
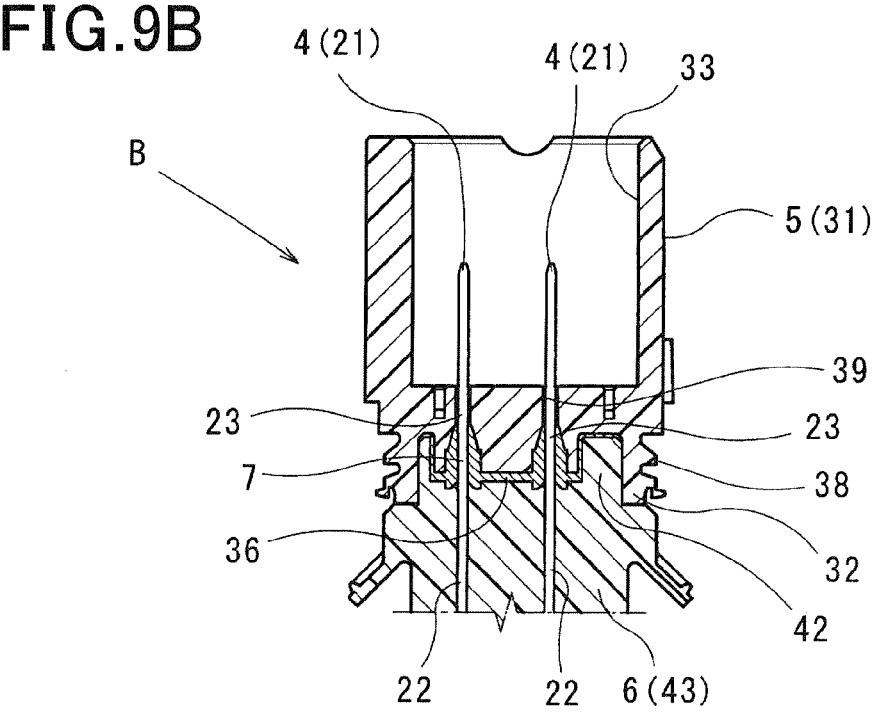
FIG. 9B shows a cross-sectional view of the electrical connector during adhesive hardening.
Figure 10:
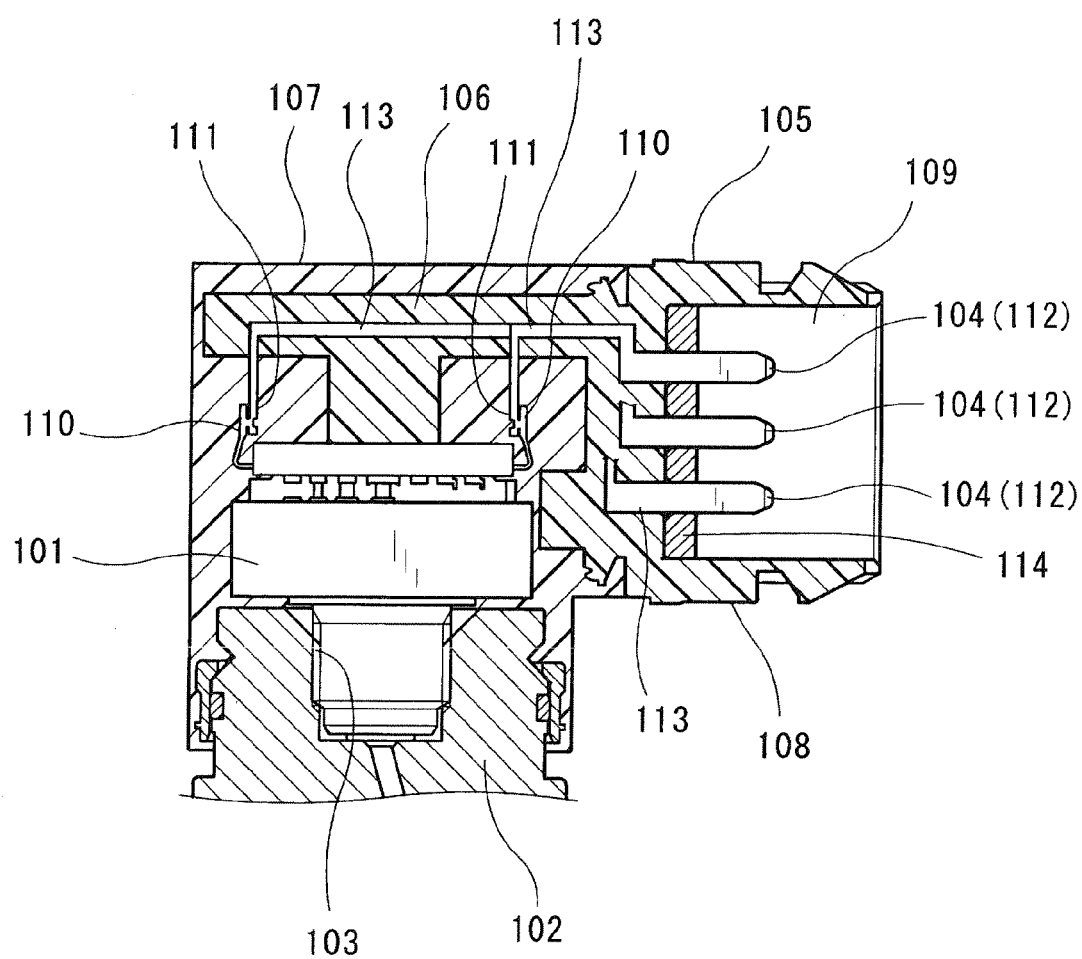
FIG. 10 is a sectional view of an electrical connector of a fuel pressure sensor mounted in a fuel injector (prior art)
Figure 11:
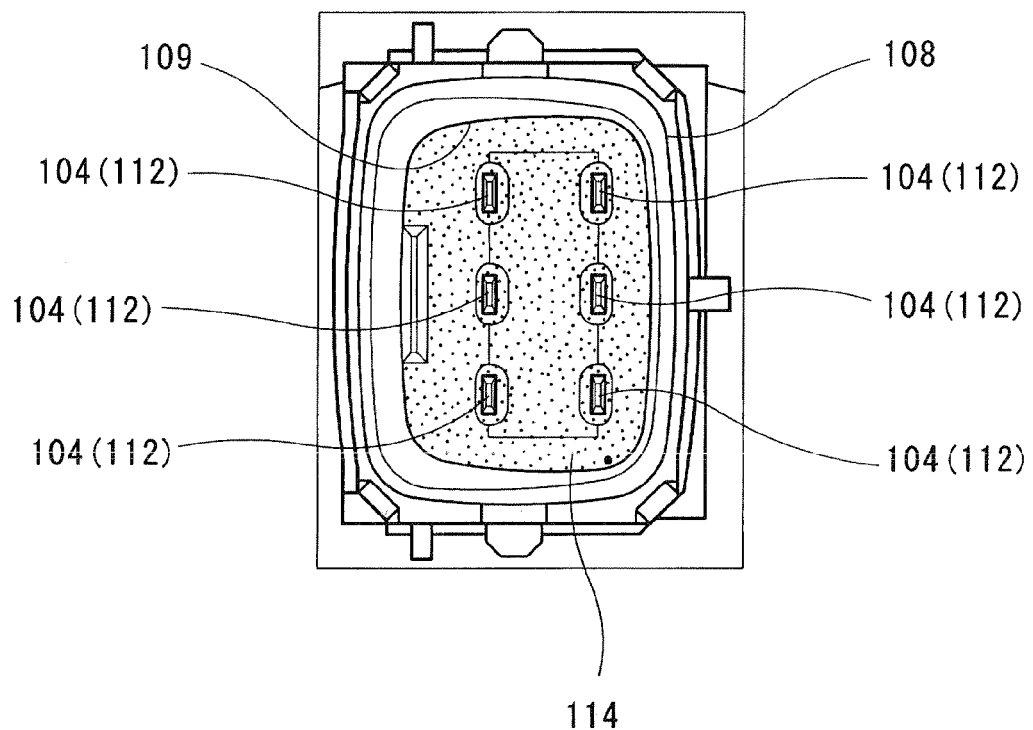
FIG. 11 shows a top view of the electrical connector of the fuel pressure sensor shown in FIG. 10 (prior art).

Next, while inserting the intermediate portions 23 of the first to sixth terminals 4 to the terminal insertion holes 39, a primary temporary assembled resin body B where the connector case 5 and the terminal holder 6 are assembled is formed by fitting the inner periphery of the first fitting peripheral wall 32 forming and the outer periphery of the second fitting peripheral wall 42, as shown in FIGS. 9A and 9B (temporary assembly step, fourth step).

At this time, the sealant filled chamber 36 that communicates with the plurality of terminal insertion holes 39 is formed in a space surrounded by the first fitting peripheral wall 32, the bottom surface of the first groove 34, the second fitting peripheral wall 42, and the bottom surface of the second groove 44.

Then, when the connector case 5 and the terminal holder 6 are fitted and assembled so as not to protrude from the liquid adhesive sealant 7 from the second groove 44, the liquid adhesive sealant 7 is filled to the sealant filled chamber 36.

Here, in the primary temporary assembled resin body B of the present embodiment, all of the terminal insertion hole 39 and the sealant filled chamber 36 are communicated, and a diameter of each insertion hole 39 in a sealant filled chamber side is larger (expanding) than a diameter thereof in an opposite side (cavity side).

Further, each insertion hole 39 of the primary molding resin temporary assembling unit B is in a tapered shape so as to gradually increase the diameter of each insertion hole 39 from a middle portion thereof toward an opening in the sealant filled chamber side.

Thus, an appropriate amount of the liquid adhesive sealant 7 applied in the second groove 44 so as to overflow from the sealant filled chamber 36 in the previous step enters into the terminal insertion holes 39 and spreads completely throughout (back side, the cavity side) the gaps (all gaps) formed between the wall of each terminal insertion hole 39 and the periphery of each intermediate portion 23 of the first to sixth terminals 4.

In a case where gaps are formed between the terminal holding section 43 of the terminal holder 6 and the peripheries of the intermediate portions 23 of the first to sixth terminals 4, the liquid adhesive sealant 7 spreads to a sealant filled chamber side of the gap, or spreads completely throughout the gaps.

In addition, the process of manufacturing the terminal holder 6, that is, the process of injection molding of the terminal holder 6, is performed in a well-known step order of placing inserting members, mold clamping, injecting, pressure holding, cooling, mold opening, and removal of a product.

In other words, the second insert molded body where the first insert molded body is insert-molded in the secondary molding resin is manufactured by forming the connector housing 8 by secondary molding that the secondary molding resin is injected and filled into the injection mold after the primary temporary assembled resin body B is inserted (secondary molding process, fifth step).

Specifically, the primary temporary assembled resin body B is disposed (set) inside the injection mold (fixed type, movable type, or core type if required) that injection-molds the connector housing 8, while a cavity (not shown) with a product shape of the connector housing 8 is formed within the injection mold.

Then, when the secondary molding resin material having fluidity (thermosetting resin material) is filled in the cavity of the mold and spreads completely therein, the mold is heated, and the product is removed from the mold after the resin is solidified.

Figure 7A:
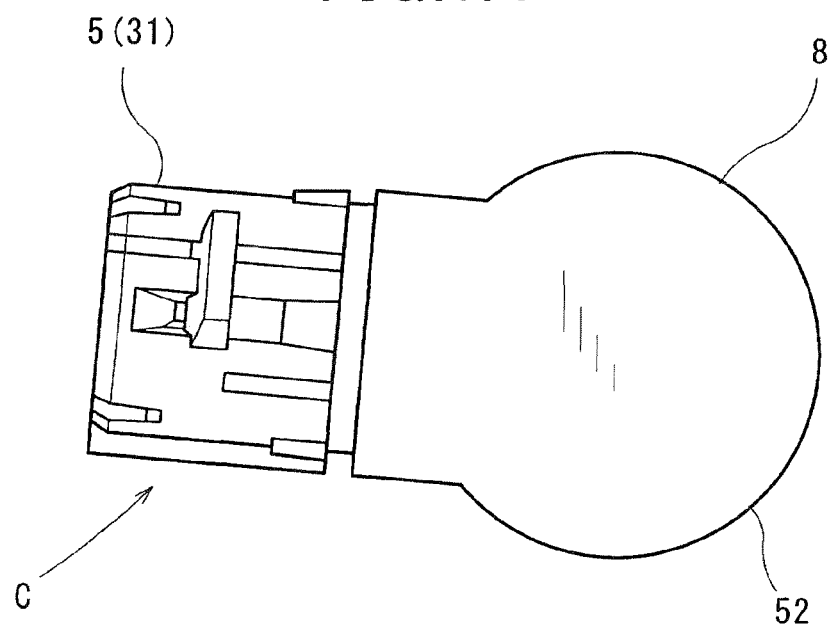
FIG. 7A shows a side view of a product shape of the electrical connector.
Figure 7B:
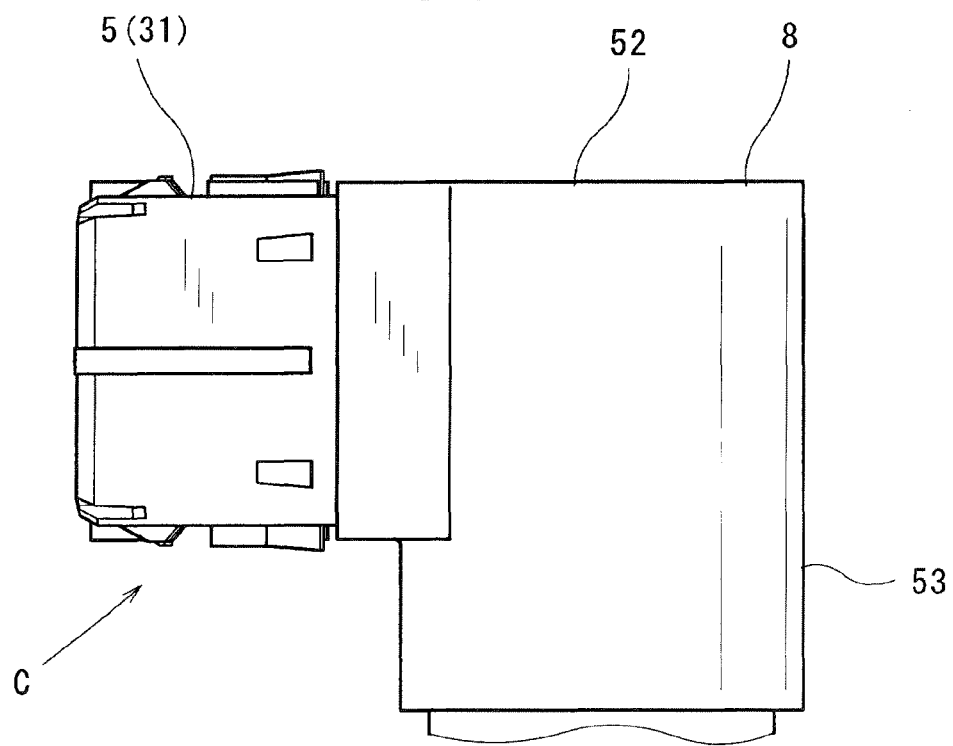
FIG. 7B shows another side view of the product shape of the electrical connector.

In this case, by heating and hardening the secondary molding resin made of epoxy based thermosetting resin and the adhesive sealant 7 made of thermosetting silicone or the like simultaneously, the connector case 5 and the first insert molded body A are bonded and fixed by using the adhesive sealant 7 to form a primary molding resin adhesive body C, while the primary molding resin adhesive body C is insert-molded in the secondary molding resin simultaneously (refer to FIG. 1, FIG. 7A and FIG. 7B).

Further, by the liquid adhesive sealant 7 spread to every hook and corner of all gaps formed between the partition wall 35 of the connector case 5 and the intermediate portions 23 of the first to sixth terminals 4 being hardened, all gaps are liquid-tightly sealed.

By performing the above-described manufacturing steps, that is, by forming the connector housing 8 that is the second insert molded body having the uneven portions 51, the holder holding unit 52, and the sensor holder 53, the second insert molded body (electrical connector 3) where the primary molding resin adhesive body C is insert-molded in the secondary molding resin is manufactured.

In addition, the primary molding resin adhesive body C is a primary molding resin adhesive body joined and fixed by bonding surfaces of the connector case 5 (the bottom surface of the first fitting peripheral wall 32, the left side surface in FIG. 1 of the partition wall 35, and the peripheral surfaces of the plurality of projections 37) with joining surfaces of the terminal holder 6 (the inner peripheral surface and the bottom surface of the second fitting peripheral wall 42).

[Effect of Embodiment]

As described above, in the electrical connector 3 of the present embodiment, the sealant filled chamber 36 that communicates with the plurality of terminal insertion holes 39 is formed in a space surrounded by the first fitting peripheral wall 32 and the bottom surface of the first groove 34 of the connector case 5 made of the primary molding resin, and the second fitting peripheral wall 42 and the bottom surface of the second groove 44 of the terminal holder 6 made of the primary molding resin.

Further, the adhesive sealant 7 for bonding the connector case 5 and the terminal holder 6 is filled in the sealant filled chamber 36.

Thereby, the sealing performance for sealing the gaps between the connector case 5, the terminal holder 6, and the plurality of intermediate portions 23 of the first to sixth terminals 4 can be improved without disturbing a functional structure of the product given a resistance against vibration (the electrical connector 3 used as the connector unit of the injector-mounted fuel pressure sensor 2).

Further, in a case of insert molding the insert part made of the connector case 5 and the terminal holder 6 that are bonded by the adhesive sealant 7 in the secondary molding resin that forms the connector housing 8, the secondary molding resin that forms the connector housing 8 and the adhesive sealant 7 filled in the sealant filled chamber 36 becomes a non-contact by surrounding around the sealant filled chamber 36 filled with the adhesive sealant 7 by the first fitting peripheral wall 32 of the connector case 5 and the second fitting peripheral wall 42 of the terminal holder 6.

Thus, since the sealant heat resistance (heat resistance reliability, heat deterioration resistance, heat deterioration adhesiveness, etc.) during the secondary molding can be secured, the decrease in adhesive strength and adhesion of the adhesive sealant 7 can be suppressed.

Therefore, since a rise in temperature transferred to the adhesive sealant 7 can be suppressed, an inexpensive heat curable adhesive liquid silicone rubber with the following hardening conditions: 1 hour at 80 degrees C., or 2 hours at 23 degrees C.) can be used as a sealant for the electrical connector 3 even if the heat during melting of the secondary molding resin exceeds sealant heat tolerance limit.

Further, even in a case where the heat (resin heat) during melting of the secondary molding resin exceeds the sealant heat tolerance limit (heat deterioration adhesiveness allowable limit), the adhesive sealant 7 is surrounded by the first fitting peripheral wall 32 of the connector case 5 and the second fitting peripheral wall 42 of the terminal holder 6.

Therefore, the secondary molding resin that forms the connector housing 8 and the adhesive sealant 7 filled in the sealant filled chamber 36 do not contact directly during the secondary molding.

Thus, since the sealant heat resistance (heat resistance reliability, heat deterioration resistance, heat deterioration adhesiveness, etc.) during the secondary molding can be secured, the decrease in adhesive strength and adhesion of the adhesive sealant 7 can be suppressed.

Therefore, since a rise in temperature transferred to the adhesive sealant 7 can be suppressed, an inexpensive heat curable adhesive liquid silicone rubber hardening conditions: 1 hour at 80 degrees C., or 2 hours at 23 degrees C.) can be used as a sealant for the electrical connector 3 even if the heat during melting of the secondary molding resin exceeds sealant heat tolerance limit.

Further, the primary molded body (connector case 5) and the first insert molding body (terminal holder 6) are formed by the primary molding that injects and fills the primary molding resin into the injection mold.

Then, hardening process of the adhesive sealant 7 (about 1 hour at about 80-90 degrees C.) can be done after mating of the connector case 5 and the terminal holder 6 until before secondary molding, or until secondary molding ends.

Accordingly, hardening time of the adhesive sealant 7 from a liquid state to be hardened can be overlapped with, or included within the heat hardening time of the secondary molding resin compared with a conventional manufacturing method of manufacturing a second insert molded body (electrical connector). The conventional manufacturing method is to perform secondary molding by inserting the primary molding resin adhesive body C after bonding and fixing the connector case 5 and the terminal holder 6. This bonding and fixing process is performed by hardening the adhesive sealant 7 after fitting the primary molded body (connector case 5) and the first insert molding body (terminal holder 6).

Therefore, it becomes possible to shorten the manufacturing time of the on-board electrical connector 3 of the injector 1.

Furthermore, it is not necessary to change the structure (shape) of the connector case 5 having the fitting hood 31 and the cavity 33 that fit with the mating connector, and while preventing the deterioration of the adhesive sealant 7 due to thermal effect during secondary molding, it is possible to improve the sealing performance for sealing the gaps between the connector case 5 or the terminal holder 6 and the plurality of intermediate portions 23 of the first to sixth terminals 4.

Thus, the sealing performance that seals the gaps between the connector case 5 or the terminal holder 6 and the intermediate portions 23 of the first to sixth terminals 4 can be imparted without impairing the function of the electrical connector 3 such as the resistance against vibration and fitting compatibility.

Moreover, in the manufacturing process, such as insert molding or integral molding to which high temperature is applied, it becomes possible to use the adhesive sealant 7 having lower heat resistance than the temperature during a conventional secondary molding (e.g., 300 degrees C.) as a sealant for the electrical connector 3.

Further, in the conventional electrical connector, there is a problem that when the adhesive sealant is coated or filled in a state of being exposed to the outside of the electrical connector, it becomes easy for it to be affected by neighboring temperature changes, thus cracks or the like enters the molding part of the sealant easily, and the durability of the adhesive sealant tends to decrease.

Therefore, in the electrical connector 3 of the present embodiment, as described above, the periphery of the sealant filled chamber 36 where the adhesive sealant 7 is filled is surrounded by the first fitting peripheral wall 32 of the connector case 5 and the second fitting peripheral wall 42 of the terminal holder 6.

Thus, the adhesive sealant 7 is no longer exposed to the outside of the electrical connector 3, and is hardly affected by the neighboring temperature changes of the electrical connector 3.

Therefore, since the cracks are unlikely to enter to the molding portion of the adhesive sealant 7 after hardening, it is possible to improve the durability of the adhesive sealant 7.

Modification

In the present embodiment, the thermoplastic resin is used as the primary molding resin that forms the connector case 5 having the fitting hood 31 to which the mating connector is fitted.

However, it is also possible to use the same synthetic resin as the primary molding resin to form the terminal holder 6 having the terminal holding section 43 that supports the terminal by embedding the intermediate portions 23 of the first to sixth terminals 4.

Moreover, it is also possible to use the primary molding resin different from the synthetic resin to form the terminal holder 6 (thermoplastic resins or thermosetting resins).

In the present embodiment, the thermosetting resin is used as the secondary molding resin that forms the fitting portion between the first fitting peripheral wall 32 of the connector case 5 and the second fitting peripheral wall 42 of the terminal holder 6, the main portion (sensor chip and the sensor circuit section 16, etc.) of the fuel pressure sensor 2, and the connector housing 8 that provides support the terminal by embedding the terminal holding section 43.

However, it is also possible to use the same synthetic resin as the primary molding resin that forms the connector case 5 or the terminal holder 6.

Moreover, it is also possible to use the primary molding resin different from the synthetic resin that forms the connector case 5 or terminal holder 6 (thermoplastic resins or thermosetting resin).

In the present embodiment, the electrical connector of the present disclosure is applied to the electrical connector 3 for external connection for electrically connecting of the piezoelectric actuator and the fuel pressure sensor 2 with the external circuit (the ECU or the battery, etc.).

However, the electrical connector of the present disclosure may be applied to an electrical connector for external connection for electrically connecting between internal apparatuses other than the piezoelectric actuator and fuel pressure sensor 2 (motors, solenoids, and other sensor units, etc.).

Further, the electrical connector of the present disclosure may be applied to an electrical connector for the internal connection for electrically connecting a circuit part or a terminal portion of an internal apparatus and a different circuit part or a terminal portion of a different internal apparatus.

Moreover, the electrical connector of the present disclosure may be used as a relay connector for connecting internal and external circuits, or a relay connector for connecting an internal circuit and a different internal circuit.

What is claimed is:

1. An electrical connector comprising:
a plurality of terminals disposed parallel with each other at predetermined intervals, each of the terminals having an intermediate portion between a tip end and a base end thereof;
a case made of primary molding resin having a bottomed cylindrical fitting hood to which a mating connector is fitted, a bottomed cylindrical first fitting peripheral wall projected toward an opposite side where the fitting hood is projected, and a plurality of insertion holes that communicates between a bottom surface of the fitting hood and a bottom surface of the first fitting peripheral wall, while the intermediate portion is inserted;
a holder made of primary molding resin having a bottomed cylindrical second fitting peripheral wall projected on a side where the second fitting peripheral wall overlaps with the first fitting peripheral wall and is fitted to an inner periphery of the first fitting peripheral wall, and a terminal holding section that supports the terminals by embedding each base end in a state where the intermediate portion is projected from a bottom surface of the second fitting peripheral wall;
a sealant filled between the bottom surface of the first fitting peripheral wall and the bottom surface of the second fitting peripheral wall, the sealant seals gaps between the case or the holder and the terminals, and bonds the case and the holder; and
a housing made of secondary molding resin that seals by covering at least the a fitting portion of the first fitting peripheral wall and the second fitting peripheral wall, and the holder; wherein,
the holder has a second groove that opens at a front end of the second fitting peripheral wall and extends from an opening of the second groove to the bottom surface of the second fitting peripheral wall, and a sealed chamber formed between the bottom surfaces of the first fitting peripheral wall and the second groove, and the holder is communicated with each insertion hole; and
the sealant is filled in the sealed chamber.

2. The electrical connector according to claim 1, wherein, the second fitting peripheral wall is disposed so as to surround a periphery of the sealed chamber in a circumferential direction.

3. The electrical connector according to claim 1, wherein, the intermediate portion is disposed so as to penetrate the sealed chamber.

4. The electrical connector according to claim 1, wherein, at least one of the case or the holder has uneven portions for increasing a bonding force between the synthetic resin that forms the housing.

5. The electrical connector according to claim 1, wherein, at the bottom surface of the first fitting peripheral wall or at the bottom surface of the second fitting peripheral wall, the case or the holder has projections projected towards the sealed chamber from portions between the adjoining intermediate portions.

6. The electrical connector according to claim 1, wherein, the primary molding resin is a thermoplastic resin, and the secondary molding resin is a thermosetting resin.

7. The electrical connector according to claim 1, wherein, the sealant is a thermosetting adhesive sealant that seals the gaps by flowing therein when being filled into the sealed chamber, and can bond the case and the holder by a subsequent heat hardening.

8. A method for manufacturing an electrical connector which comprises:
- a plurality of terminals disposed parallel with each other at predetermined intervals, each of the terminals having an intermediate portion between a tip end and a base end thereof;
- a case made of primary molding resin having a bottomed cylindrical fitting hood to which a mating connector is fitted, a bottomed cylindrical first fitting peripheral wall projected toward an opposite side where the fitting hood is projected, and a plurality of insertion holes that communicates between a bottom surface of the fitting hood and a bottom surface of the first fitting peripheral wall, while the intermediate portion is inserted;
- a holder made of primary molding resin having a bottomed cylindrical second fitting peripheral wall projected on a side where the second fitting peripheral wall overlaps with the first fitting peripheral wall and is fitted to an inner periphery of the first fitting peripheral wall, and a terminal holding section that supports the terminals by embedding each base end in a state where the intermediate portion is projected from a bottom surface of the second fitting peripheral wall;
- a sealant filled between the bottom surface of the first fitting peripheral wall and the bottom surface of the second fitting peripheral wall, the sealant seals gaps between the case or the holder and the terminals, and bonds the case and the holder; and
- a housing made of secondary molding resin that seals by covering at least the a fitting portion of the first fitting peripheral wall and the second fitting peripheral wall, and the holder; wherein:

the holder has a second groove that opens at a front end of the second fitting peripheral wall and extends from an opening of the second groove to the bottom surface of the second fitting peripheral wall, and a sealed chamber formed between the bottom surfaces of the first fitting peripheral wall and the second groove, and the holder is communicated with each insertion hole;

the sealant is filled in the sealed chamber; and the method comprises:
- a step of manufacturing the primary molded body having the fitting hood, the first fitting peripheral wall, and the plurality of insertion holes by forming the case by primary molding that fills a thermoplastic resin which is the primary molding resin into a mold;
- a step of manufacturing a first insert molded body by insert-molding the plurality of terminals to form the holder by primary molding that fills the primary molding resin into the mold;
- a step of forming the sealed chamber between the bottom surfaces of the first fitting peripheral wall and the second groove, and filling a liquid thermosetting adhesive sealant having fluidity used as the sealant into the sealed chamber;
- a step of manufacturing a primary temporary assembled resin body by assembling the primary molded body and the first insert molded body by fitting the first fitting peripheral wall and the second fitting peripheral wall while inserting the middle portions of the plurality of terminals into the plurality of insertion holes; and
- a step of forming the housing by insert-molding the primary temporary assembled resin body by secondary molding that fills the secondary molding which is a thermosetting resin into the mold, forming a primary molding resin adhesive body by bonding and fixing the primary molded body and the first insert molded body by using the sealant, and manufacturing the second insert molded body by insert-molding the primary molding resin adhesive body into the thermosetting resin simultaneously.

* * * * *